United States Patent [19]
Arroyo et al.

[11] Patent Number: 5,113,036
[45] Date of Patent: May 12, 1992

[54] MODULAR CABLE

[75] Inventors: Candido J. Arroyo, Lithonia; Manfred R. Gotthardt, Lawrenceville, both of Ga.

[73] Assignee: AT&T Bell Laboratories, Murray Hill, N.J.

[21] Appl. No.: 514,068

[22] Filed: Apr. 25, 1990

[51] Int. Cl.⁵ .......................... G02B 6/44; H01B 7/04; H01B 7/08
[52] U.S. Cl. .................................. 385/100; 138/117; 174/70 R; 174/70 C; 174/97; 174/117 R
[58] Field of Search .................. 174/70 R, 70 C, 71 R, 174/72 R, 72 A, 72 C, 95, 97, 117 R, 117 F; 104/275; 138/111, 115, 117; 350/96, 23

[56] References Cited

U.S. PATENT DOCUMENTS

| | | | |
|---|---|---|---|
| 2,888,511 | 5/1959 | Guritz | 174/117 R |
| 3,357,455 | 12/1967 | Plummer | 174/95 X |
| 3,554,236 | 1/1971 | Rhodes | 138/117 |
| 4,665,280 | 5/1987 | Bowen | 174/71 R |
| 4,801,764 | 1/1989 | Ohlhaber | 174/70 C |
| 4,815,814 | 3/1989 | Ulijasz | 174/71 R X |

FOREIGN PATENT DOCUMENTS

| | | | |
|---|---|---|---|
| 0259051 | 3/1988 | European Pat. Off. | |
| 1077737 | 3/1960 | Fed. Rep. of Germany | 174/117 R |
| 1465784 | 5/1969 | Fed. Rep. of Germany | 174/117 F |
| 1131518 | 10/1956 | France | 174/97 |
| 2545973 | 11/1984 | France | 174/117 R |
| 653601 | 5/1963 | Italy | 174/117 R |
| 59-231505 | 12/1984 | Japan | 174/71 R |
| 60-63819 | 4/1985 | Japan | 174/71 R |
| 2102909 | 2/1983 | United Kingdom | 138/111 |

OTHER PUBLICATIONS

"Fiber Optics Swept Under the Carpet for Sensitive Data Improved Security", *Design News*, pp. 47–48, Aug. 4, 1986.

Advertisement, *Math Associates, Inc.* brochure 1986, p. 46.

"Optical Cable Develops 'Carpet Tracks'", *Fiber Optic News*, Jun. 5, 1989, pp. 3–4.

"Fiber Optic Cable for Under Carpets", *Aerospace Products*, p. 20, New Product Technology, Aug. 1989.

*Primary Examiner*—Morris H. Nimmo
*Attorney, Agent, or Firm*—Edward W. Somers

[57] ABSTRACT

An undercarpet cable (40) includes a plurality of longitudinally extending interlocking segments (42—42). The segments are designed each to have an optical fiber (33) housed therein or when interlocked in an assembly to provide a longitudinally extending cavity for receiving an optical fiber. The assembly of segments is capable of being routed along at least two paths which are normal to each other. Advantageously, longitudinal relative motion between adjacent ones of the segments and between the optical fiber and the segments is allowed. As a result, the cable may be routed in tortuous paths under a carpet to service workstations as desired.

18 Claims, 3 Drawing Sheets

MODULAR CABLE

TECHNICAL FIELD

This invention relates to a modular cable. More particularly, the invention relates to a cable which may be used under a carpet, in cabinets or in wiring closets and which may include one or more optical fibers.

BACKGROUND OF THE INVENTION

The protection of transmission media in building distribution systems is important to the integrity of the transmission media. Such transmission media include, for example, optical fiber and coaxial cable. As is well known, coaxial cable includes a center metallic conductor enclosed in a layer of dielectric material, a tubular outer metallic conductor and a plastic jacket. As also is well known, copper transmission media such as coaxial cable were the mainstay of the communications transmission market until the 1980's. During that decade, the use of optical fiber advanced at an incredible pace. Optical fiber which offers greater bandwidths and provides greater immunity to electromagnetic noise and interference to ensure error-free transmission of information is destined to experience widespread use in premises distribution systems.

Customers, users, and sales personnel share the concern of the possibility of damaging installed fiber, especially where copper conductors and optical fiber are integrated in common transmission media systems. For example, in data link applications, fibers are routed into data cabinets which house electronic equipment. In most cases, it has been the practice to remove a protective outer sheath system from a bundle of fibers at or near the point of entry into the cabinet. After connector plugs are installed on each fiber, they may be run alongside power, twisted pair, or coaxial cables, thereby placing them in a vulnerable environment. Activities such as equipment change-out, testing, and cable rearrangements are normal occurrences.

Also to be avoided is damage to optical fibers which are routed under carpets from wiring closets to workstations. Undercarpet cables, which transmit voice and data communications, are being used increasingly today in buildings. These are needed to extend transmission medium service from ceiling plenums or risers to various locations on a building floor to service office equipment. Obviously, drops from an overhead plenum could be made directly at points where connections must be made, but such drops are unsightly. Hence, from an aesthetic point of view, it becomes important to be able to provide cables which may be routed under an office carpet.

Buffered optical fibers have been used in such environments. A buffered optical fiber is a coated optical fiber which includes an additional plastic cover, the material of which generally has been polyvinyl chloride (PVC). However, in these kinds of environments, there has developed a feeling of insecurity about the protection offered by the buffer layer which surrounds the optical fiber.

Another concern which has developed is the comparatively high cost involved in providing post-construction undercarpet cables to off-wall workstations within buildings. Although the cost for undercarpet cable may be higher than costs for conventional cables which are installed under carpet, the installation costs for the latter bring the total installed cost to be higher than the former. Also, cables specially designed for undercarpet use are ideal for campus type environments and for renovations.

Requirements for a cable that can be used under carpet are somewhat stringent. Of course, the cable must include provisions for protecting mechanically the transmission media included therein. This is particularly important when the transmission media is optical fiber. Also, the layout of undercarpet cable on any given building floor may involve tortuous routes wherein the cable must assume a curved configuration. Any cable which overcomes the foregoing problems must be suitable for the inclusion of optical fiber as well as copper media. Optical fiber which is relatively fragile must be protected from abuse either in the gross sense which, for example, involves macrobending, or in the minute sense of microbends. Further of importance is the ability to customize in the field cables for such uses. This capability would expedite installations and add a new dimension to undercarpet communications wiring systems.

Desirably, cables which may be suitable for use under carpets also should be capable of being used in adjacent cabinetry, for example. Therein, cables may be needed to extend service from incoming lines to outgoing lines which extend under a carpet.

One way used to route electrical conductors is by the use of a copper ribbon cable which has a plurality of spaced parallel electrical conductors disposed within a thin, flexible layer of insulation and which is disposed under carpeting in, for example, office areas. A change in direction in such a flat cable is achieved by sharply folding the cable upon itself so that stacked layers of the cable result at the bend. Although such a method of changing direction can be used with a ribbon cable having spaced copper wires which can undergo a 90 or 180 degree bend, this method of changing direction is not suitable for a cable assembly which includes optical fiber or coaxial cable. Sharp bending of optical fiber will result in light attenuation and sharp folding of optical fiber will cause breaks. Folding of a coaxial cable will mechanically damage the shield, displace the dielectric between the inner and outer conductors, and cause a change in the impedance characteristics of the cable. Also, folding of a cable doubles its thickness, which could make the presence of the cable under carpeting more noticeable. Of course, bending of a flat cable in the plane of the cable results in no appreciable increase in cable thickness. However, copper ribbon cable is not capable of being bent in the flat plane of the cable without curling unless the copper media therein can move independently of the ribbon material.

Other approaches include the use of preformed, flat conduit lengths which are connected together in a longitudinal direction to form a track. Each segment contains grooves into which optical fiber may be placed. Systems such as these appear to be used mainly for permanent installations, inasmuch as any rearrangement would be difficult and labor intensive. Another approach is to use fully-sheathed flat undercarpet fiber cables, which also can be installed in a post-construction environment. These are ideal for straight line runs; however, any change in direction may require the cutting away of portions of the sheath and the addition of hardware to achieve bends and turns. Still another alternative is to cut channels into a floor and to install conduit, a very costly choice.

One recently proposed coaxial cable assembly for use under carpeting includes a jacket of polyvinyl chloride (PVC) having a central portion, which holds a small coaxial cable, and side portions each having a stress-bearing plastic member. The stress-bearing members, which are relatively inelastic, are independently longitudinally movable in the jacket. Bending of the cable assembly causes the member at the inside of the bend to extend beyond the jacket while the member at the outside of the bend is drawn inside the jacket.

A cable of U.S. Pat. No. 4,665,280 provides a fixture which provides both support and protection for elongated members of an undercarpet cable throughout the length of a turn. The fixture is a formed rigid member defining at least two tracks between an inlet and an outlet spaced apart in a plane and angularly offset with respect to each other. One of the tracks defines ar arcuate path. Each subsequent track is spaced radially inwardly from the arcuate track and defines a curvilinear path of equal length to the length of the arcuate outer path.

Some cables which have been used for undercarpet situations for transmitting light or power have included a pair of sloped surface flange portions on the marginal sides of a central web which holds one or more optical fibers, strengthening members and/or electrical conductors. A typical example of such cable can be found in U.S. Pat. No. 4,419,538. See also U.S. Pat. No. 4,801,764. In bending this type of cable, the inner sloped flange must be compressed while the outer sloped flange is stretched and the elongated members are relatively longitudinally displaced. It should be appreciated that the bending of a flat object in the plane of the object is not an easy task.

A. cable assembly disclosed in U.S. Pat. No. 4,815,814 includes at least one resilient buffer tube and at least one optical conductor inside the tube and movable therein. At least one strength member and a plastic jacket formed about the tube and the strength member are included in the assembly. The jacket may have substantially flat, parallel top and bottom surfaces with the tube and strength member being disposed in the jacket substantially midway between these surfaces. The tube and the strength member are spaced and their respective axes are positioned in a plane which is generally parallel to the bottom surface. Also disclosed is a generally flat fiber optic cable assembly manufactured with a right angle turn section.

The prior art also includes an undercarpet cable which has a so-called zip design which allows breakout of a duplex fiber optic center subcable portion of the cable. There may be other alternatives, but those described hereinbefore are the most prevalent and illustrate some of the problems associated with current offerings of undercarpet fiber cable.

What is sought after is an undercarpet cable which accommodate one or more transmission media. The sought after cable desirably is thin and relatively flat, and limits bending in the plane of the cable assembly so that the transmission media will function properly and will be protected from mechanical damage. The cable should include provisions for facilitating breakout of portions of the transmission media from remaining portions. Also, the desired cable should be unobtrusive when installed under carpeting and should be capable of supporting normal loads without functional or mechanical damage to the transmission media. Furthermore, the cable should be reliable in use, have long service life, be lightweight and be relatively easy and economical to manufacture.

What is needed and what seemingly is not yet available in the prior art is an undercarpet cable system which is robust and which is easily routed in expected paths within an office. The sought-after cable would be one which desirably may be custom fitted to particular fiber sizes depending. for example, on the number of workstations to be serviced by the cable.

SUMMARY OF THE INVENTION

The foregoing problems of the prior art have been solved by the modular cables of this invention. A cable comprises an assembly of a plurality of longitudinally extending segments which are made of a plastic material with adjacent ones of the segments being interlocked in a manner which allows relative longitudinal movement between them. The assembly is capable of being routed along at least two paths which are normal to each other. Also included is at least one transmission medium such as an optical fiber which extends coextensively longitudinally with the segments and is disposed within an outer periphery of adjacent segments at least when the adjacent segments are interlocked together. Advantageously, the at least one transmission medium is capable of movement independently of the segments.

A cable of this invention also may include a plurality of segments which may be assembled in the field with each segment including a transmission medium extending longitudinally therewith. Of course, the segments may be preassembled in the factory and shipped in accordance with customer orders. An optical fiber, for example, may be included in each segment as the segment is manufactured such as by extrusion.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
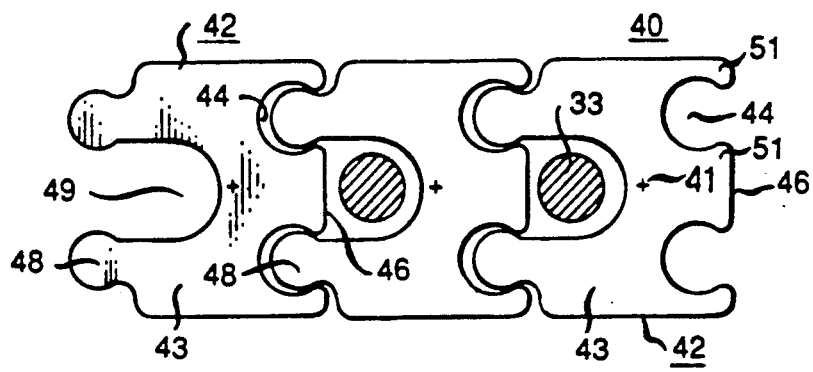
FIG. 1 is an end elevation view of a modular cable of this invention.

Referring now to FIG. 1, there is shown one embodiment of a modular cable of this invention which includes one or more optical fibers 33–33. As can be seen in that figure, a modular cable 40 includes a plurality of segments 42—42. Each segment 42 includes a body portion 43 having a longitudinal axis 41 having two spaced grooves 44—44 opening to a surface 46 thereof.

From an opposite side of the body portion 43 project two spaced ribs or rails 48—48. Formed between the two rails is a cavity or channel 49. Each of the rails 48—48 is adapted to be received in one of the grooves 44—44. Further, each of the segments is made of a plastic material such as polyvinyl chloride (PVC), for example. The cable 40 is ideally suited for use under a carpet to provide service to workstations disposed about a floor 50 (see FIG. 2).

The above-described structure facilitates the assembly of the cable 40 by interlocking two or more of the segments 42—42. During the assembly of a plurality of the segments, at least one optical fiber 33 is caused to be disposed in the channel 49 of one of the segments. Then as the one segment is caused to be snap-locked to the other segment, the fiber 33 or fibers becomes enclosed between the body portion of the one segment and the body portion of the other segment. The optical fiber 33 which is caused to be disposed within a longitudinally extending cavity formed between the two adjacent segments may be a coated optical fiber or each may be a buffered optical fiber which is a coated-optical fiber enclosed with a relatively thick layer of PVC and having an outer diameter of 0.089 cm. Then the one segment is juxtaposed to another segment and the rails of the one segment caused to be inserted into the grooves of the other segment.

Figure 3:
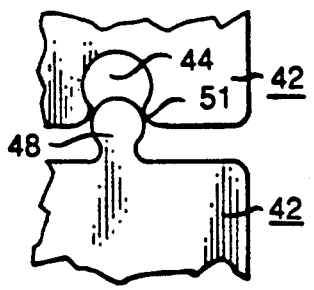
FIGS. 3, 4, and 5 depict portions of adjacent segments of a cable of this invention during assembly thereof.
Figure 4:
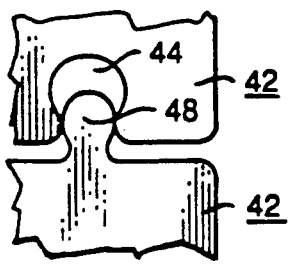
Figure 5:
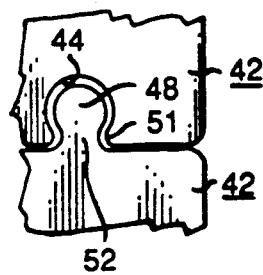

During the assembly process, as can be seen in FIGS. 3-5, some deformation occurs in the segments. However, these deformations are temporary and the stresses are well within those permitted of the material of which the segments are made. The dimensions of the rails and of the grooves are such that the rails snap-lock into the grooves. As can best be seen in FIG. 3, each of the grooves 44—44 is partially circularly shaped with an entrance thereto including opposed radiused lips 51—51. The configuration may be such that if the diameter of the partially circular portion is 0.5 x, x being a unit of measurement, the clearance between the lips is about 0.25 x and the diameter of each rail is 0.44 x for example. As a result of these configurations, the rails 48—48 must deform elastically as they are moved past the lips 51—51 (see FIG. 4). After the rails 48—48 have become disposed in the grooves 44—44, the lips 51—51 return to their original configuration and lock in about a nick portion 53 which connects each rail to the center body portion of the segment 42 (see FIG. 5).

It should be realized that after initial portions of the rails 48—48 of one segment have been successfully inserted into the channel formed between the side arms of another segment, further assembly of the two is relatively simple. This is accomplished by a craftsperson sliding two fingers along the segments and applying suitable pressure between the two. Upon the application of suitable forces, they may be disassembled from each other.

It should be observed from FIG. 1, that upon assembly of the two segments, the optical fiber 33 disposed in the channel 49 of the one segment is contained between the body portion 43 of the one segment and the surface 46 of the other segment. Further, the optical fiber is disposed loosely therein so that relative movement between adjacent segments does not impart undue stresses to the fiber.

Figure 6:
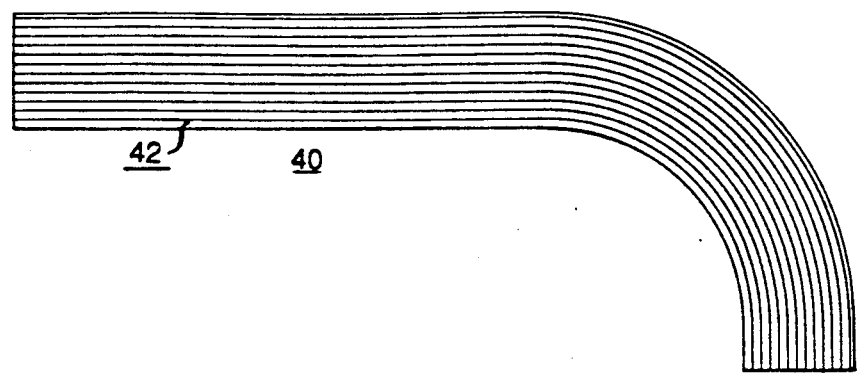
FIG. 6 is a plan view of a cable of this invention routed in an arcuate path.

Advantageously, during bending in a plane parallel to a floor, relative longitudinal movement is permitted between two adjacent segments while the interlock between the two is preserved (see FIG. 6). This freedom of movement provides the needed flexibility for bending interlocked segments in a plane parallel to the floor 50 to be routed around columns 52—52 or other surface along which the cable 40 is routed (see FIG. 2). In order to make a bend in the plane of the cable as is shown in FIG. 6, a correct length segment may be used for the outer portion of the curve. Other segments of the cable assembly may be severed to cause the ends of the segments at each end of the turn to be coplanar.

Another feature of the inventive cable 40 is the capability of customizing the cable to suit office needs. The cable 40 comprises a plurality of interlocking segments. Any reasonable number of the segments 42—42 may be assembled together (see FIG. 6) to provide a cable 40 depending, for example, on the number of workstations which must be served.

Should it become necessary to access one or more of the optical fibers, the cable 40 may be disassembled. This is accomplished by applying forces at one end of the cable to separate a group of segments 42—42 from adjacent segments. Afterward, forces are applied to peel back the group of segments 42—42 from the remaining ones. Under the application of suitable forces, the outwardly directed portions of the rails of one segment become disassociated from the inwardly directed portions of the grooves 44—44 of the adjacent segment.

Figure 2:
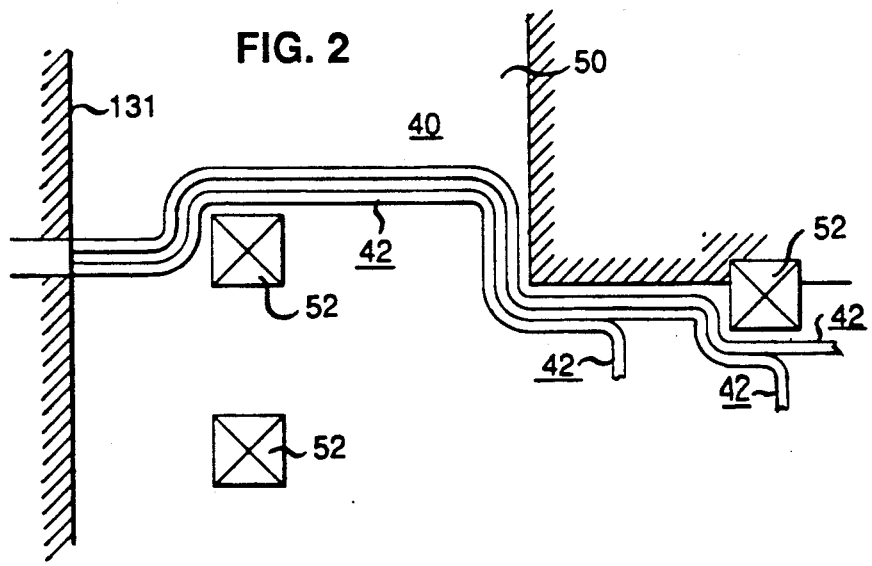
FIG. 2 is a plan view of a layout for optical fiber cable under a carpet on a building floor.

When the cable 40 is used in a floor layout as is shown in FIG. 2, an optical fiber 33 is not included in each channel 40. For each group of segments 42—42 which are separated from the cable assembly 40 and routed to a workstation, that segment of the group having an exposed channel 49, such as the left hand one in FIG. 1, is not provided with an optical fiber 33. Hence, when the layout is planned, some of the segments, which may be interiorly disposed in the initial cable assembly but which are destined to become outer segments of separated groups are not provided with fibers.

Figure 7:
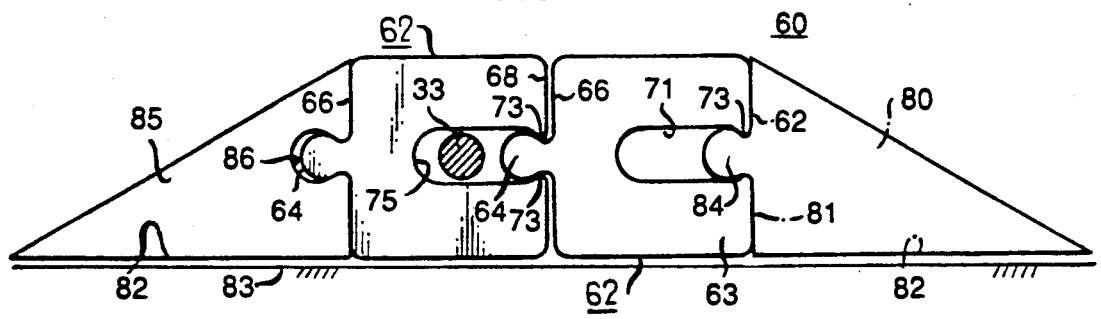
FIG. 7 is an end elevational view of an alternative embodiment of this invention.

Another embodiment of this invention is depicted in FIG. 7. A modular cable 60 includes a plurality of segments 62—62 each of which includes a body portion 63 and a longitudinal rail 64 extending from one surface 66 thereof. Opening to a surface 68 which is opposite to the surface 66 is a groove 71 having opposed lips 73—73 at an entrance thereto.

The rail 64 and the groove 71 are formed such that the rail of one segment is adapted to be received in a groove of another segment which is juxtaposed adjacent to the one segment. The juxtaposition is such that the surface 66 of the one segment is adjacent tot he surface 68 of the other segment. Further, in order to cause the rail of one segment to be received in the groove 71 of another segment, the rail deforms elastically the opposing lips 73—73 as the rail is moved into the groove. After the rail has been moved past the opposing lips 73—73 of a groove, the lips return to their original configuration and snap-lock behind the rail to hold the rail within the groove.

Also, as can be seen in FIG. 7, the rail 64 which is received in a groove 71 of another segment is limited to the extent of its movement within the groove. Inasmuch as the distance by which the rail extends from the surface 66 is much less than the depth of the groove 71 from the surface 68, the movement of the rail in the groove is discontinued when the surface 66 from which the rail extends engages the surface 68 to which the groove opens.

As a result of this control over the depth to which a rail is received in a groove 71, there is sufficient distance within the groove from the rail received therein to an invert 75 of the groove to facilitate the receipt of an optical fiber therein. Hence, as a result, the optical fiber which becomes disposed within the groove is free to move independently of the segments which form the groove and its cover.

In order to complete the cable of FIG. 7 for undercarpet use, outer segments 62—62 of each assembly are provided with side portions 80 and 85. Each side portion 80 is wedge shaped and for the assembly of FIG. 7, a surface 81 which is normal to a surface 82 which is to be supported by a floor 83 includes a longitudinally extending rail 84. The rail 84 is adapted to be received in a groove 71 of a segment 62. On an opposite side of the segments 62—62, a side portion 85 is provided and includes a longitudinally extending groove 86. The groove 86 of the side portion 85 is adapted to receive a longitudinally extending rail 64 of an outer one of these segments. What should be apparent is that each of the side portions may move independently of the segment to which it attaches. As a result, the segment or segments may be united in an arcuate path whereupon the side portions as indeed other segments of a multi-segment cable move slidably with respect to an adjacent portion of the cable assembly. Also, the side portions 80 and 85 function to distribute forces that are imparted to the segments 62—62 and to relieve the otherwise abrupt drop-off of the end segments of the modular cable 60. Although the tapered side portions have been described with respect to FIG. 7, it should be clear that the cable 40 of FIG. 1 also could be provided with them.

Figure 8:
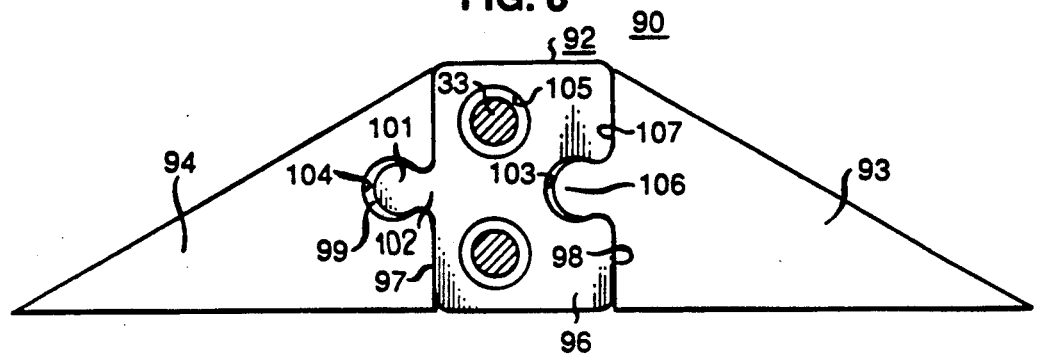
FIG. 8 is an end elevational view of a preferred embodiment of the invention.

A preferred embodiment of the invention is depicted in FIG. 8. A cable assembly 90 includes one or more segments 92—92 and two side portions 93 and 94. Each of the segments 92—92 includes a body portion 96 having opposed surfaces 97 and 98. Projecting from the surface 97 is a longitudinally extending rail 99 having a somewhat circularly shaped head 101 and a stem 102 connecting the head to the main body portion of the segment. The rail 99 is adapted to be received in a groove 103 which opens to a surface 98 of another segment to be assembled with the one segment. Of course, the rail 99 of an outer one of the segments of an assembly is adapted to be received in a groove 104 of a side portion 94. The other outer one of the segments of an assembly includes an outwardly facing groove 103 which is adapted to receive a rail 106 of the other side portion 93. A surface 107 of the side portion 93 abuts the surface 98 of a segment 92 to which it is assembled.

In this embodiment, the optical fibers 33—33 are carried within the body portion. To this end, the body portion is provided with at least one and preferably two longitudinally extending bores or passageways 105—105. Each of the bores 105—105 has a cross-sectional configuration which is generally circular and which is larger than that of the largest coated, buffered optical fiber to be received therein. As before in the other embodiments, each oversize bore 105 allows the fiber therein to move independently when the cable assembly is subjected to bending and/or twisting.

Figure 9:
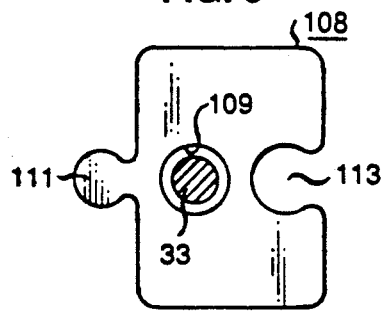
FIG. 9 is an end view of an alternative embodiment of the cable of FIG. 8.

As is seen in FIG. 8, the bores 105—105 are disposed to each side of the groove 103. As a result, each bore 105 is surrounded by more plastic material and the resultant segment has more mechanical strength than a segment 108 (see FIG. 9) in which one bore 19 is formed in alignment with a single rail 111 and aligned groove 113.

It should be apparent that each segment 92 could be formed with two rails and two grooves as is the segment 42 of FIG. 1. Such a modification provides more mechanical strength for the assembly of a plurality of segments.

The optical fiber which is disposed within the segment 92 of FIG. 8 may be positioned therein during manufacture of the segment. As a segment 92 is extruded, for example, an optical fiber 33 may be fed through a core tube (not shown) of an extruder.

It will be recalled that cables 40—40 do not have an optical fiber 33 in each channel 49 because one of the segments 42—42 of each separated group in a breakout has an uncovered channel along one side. Unlike the cable 40, the cable assembly 90 is such that each segment may be provided with optical fiber inasmuch as the fiber is totally enclosed within the body portion thereof and not exposed in an uncovered groove during breakout.

Figure 10:
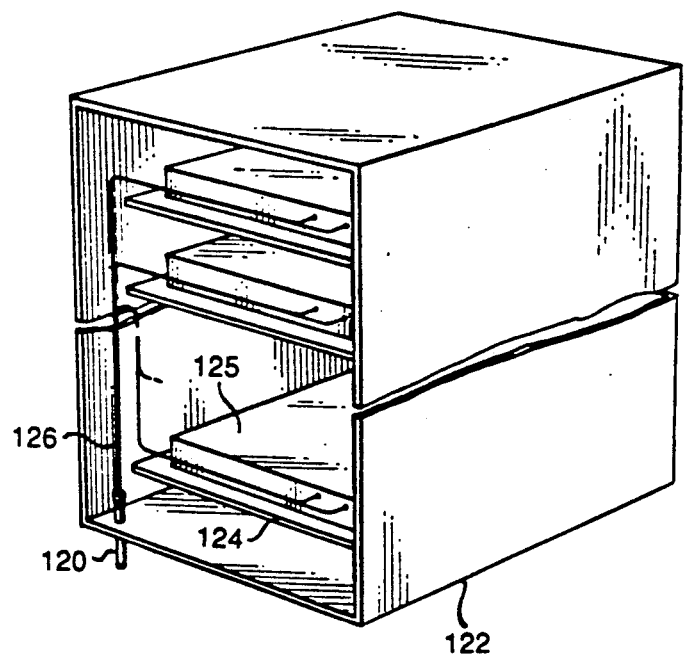
FIG. 10 is a perspective view of a cabinet in which cables of this invention may be used.

The cables of this invention also may be used to protect optical fibers which are routed in cabinets (see FIG. 10). For example, an optical fiber cable 120 may enter a cabinet 122. Inside the cabinet 122, sheath components of the cable 120 are removed and optical fibers are routed to desired platforms 124—124 and to equipment 125 disposed on these platforms.

Advantageously, the cable 120 may include a sub-cable 126 such as the cable 90 described hereinbefore. At each level, one or more segments 92—92 may be disassembled from the sub-cable 126 and routed to a desired location on the platform. At that location, the segment is removed to expose the optical fiber carried therein to allow connection of the optical fiber to the desired equipment.

Figure 11:
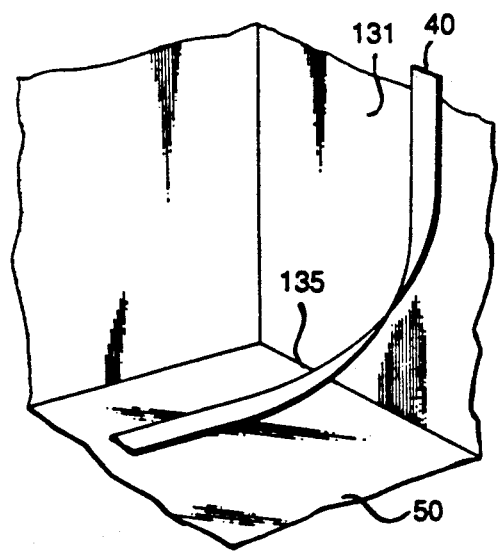
FIG. 11 is a perspective view of a cable of this invention in transition from a wall to a floor.

Viewing again FIG. 2, there is shown a cable of this invention such as the cable 40, for example, as it is routed from a wall 131 to an undercarpet pass along the floor 50. As can be seen in FIG. 11, the cable may be caused to assume a 90° turn in the plane of the cable such as in a transition from a wall to a floor by imparting a twist to one portion of that length of the cable which undergoes the transition. A twist of 180° and a bend of 90° upward permits the assembly to rise from the floor to the wall. Because the fibers are loosely captured within the assembly, relative movement between the fibers and the segments of the assembly can occur. In FIG. 11, the twist in the cable is exaggerated for purposes of clarity. In use, the curved portion is much closer to an intersection 135 of a plane of the wall 131 and the floor 50 than is shown.

The cable assembly of this invention is characterized by having what is referred to as breakout flexibility. As a cable assembly is routed along a path on an office floor, for example, transmission media may be routed to desired workstations simply by separating the desired segments from the assembly. The segments remaining in the assembly are continued past the desired workstation toward another workstation whereat another breakout is performed.

This breakout principle also may be used to advantage to allow the cable of this invention to be used as a riser cable. At desired floors, one or ones of the segments of the cable assembly is separated from the assembly and routed to equipment on the desired floor. The remaining assembly is continued along the riser shaft to other floors.

It is to be understood that the above-described arrangements are simply illustrative of the invention.

Other arrangements may be devised by those skilled in the art which will embody the principles of the invention and fall within the spirit and scope thereof.

We claim:

1. A modular cable, which comprises:
   an assembly of a plurality of longitudinally extending segments each of which is made of a plastic material and each of which has a longitudinal axis with axes of the segments of said assembly lying in a plane and with adjacent ones of said segments being interlocked in a manner which allows relative longitudinal movement between adjacent ones of the segments, said assembly being capable of being turned in an arcuate path which lies in said plane; and
   at least one transmission medium which extends coextensively longitudinally with said segments and which is disposed within an outer periphery of adjacent segments at least when said adjacent segments are interlocked together, said at least one transmission medium being capable of movement independently of said segments should said assembly be turned in an arcuate path which lies in said plane.

2. The cable of claim 1, wherein each of said segments includes a body portion and pair of spaced longitudinally extending rails having a longitudinally extending cavity disposed therebetween and a pair of grooves, said cable being assembled by causing the rails of one of said segments to be received in the grooves of an adjacent segment with said cavity of said one segment being enclosed by a portion of said adjacent segment disposed between the grooves of said adjacent segment.

3. The cable of claim 2, wherein each of said rails includes a partially circular head portion which is connected by a stem portion to said body portion of said segment.

4. The cable of claim 3, wherein each of said grooves includes an entrance portion defined by a pair of opposing lips and wherein when a rail of one segment is received in a groove of another segment, the lips of said other segment are deformed elastically as the rail of the one segment is moved therepast.

5. The cable of claim 1, wherein each said segment includes a pair of longitudinally extending grooves which open to one surface thereof and with each segment including a pair of spaced rails projecting from an opposite surface thereof, each of said rails of one segment being adapted to be received in one of the grooves of another segment which is to be assembled to said one segment.

6. The cable of claim 5, wherein said rails are formed to provide longitudinally extending cavity therebetween, said cavity being such that when a segment is assembled to another such segment, said cavity of one becomes covered by the one surface of the other, the cover cavity having received therein an optical fiber transmission medium.

7. The cable of claim 6, wherein each of said rails of one segment is adapted to snap-lock into a groove of another segment adapted to become assembled to said one segment.

8. The cable of claim 1, wherein each of said segments includes a longitudinally extending groove which opens to one surface thereof and a longitudinally extending rail which projects from an opposite surface thereof, said groove having opposed lips at an entrance thereof, said lips being deformable to allow the rail of another segment to be moved therepast and become disposed in said groove.

9. The cable of claim 8, wherein said groove cavity has a depth as measured inwardly from said one surface which is greater than the sum of the outer diameter of the transmission medium received therein and the distance as measured from said one surface by which a rail extends into said groove when two of said segments become interlocked together.

10. The cable of claim 8, wherein the transmission medium is a coated optical fiber and each said segment includes a longitudinally extending passageway having a coated optical fiber disposed therein, the passageway having a transverse cross section which is larger than that of the coated optical fiber received therein to allow relative movement between said optical fiber and said segment, said passageway, rail and groove being aligned along an axis.

11. The cable of claim 8, wherein the transmission medium is a coated optical fiber and each said segment includes two longitudinally extending passageways having a coated optical fiber disposed therein, each passageway having a transverse cross section which is larger than that of the coated optical fiber disposed therein to allow relative movement between the optical fiber and said segment, each said passageway being disposed between an axis which extends through said rail and said groove and an outer surface of said segment which is normal to said one surface to which said groove opens.

12. The cable of claim 8, which includes parallel surfaces which are normal to each said surface from which a rail extends, said cable being capable of being routed along a first supporting surface and along a second supporting surface which is normal to said first supporting surface with one parallel surface of said cable engaging said first supporting surface and with the other parallel surface being adjacent said second supporting surface.

13. The cable of claim 1, wherein each of said segments include top and bottom sides and wherein said cable includes two other portions each of which is adapted to become assembled to an adjacent one of said segments having parallel top and bottom sides, each said outer portion being tapered from a height equal to that of an adjacent segment to a plane extending along a bottom side of said adjacent segment.

14. The cable of claim 13, wherein each said outer portion is adapted to be interlocked with an adjacent segment.

15. An enclosing structure for a transmission medium, said structure including:
   first and second longitudinally extending segments each of which is made of a plastic material and each of which has a longitudinal axis; and
   said first and second segments being capable of being interlocked with each other such that said longitudinal axes lie in a plane and such that the interlocked segments are capable of being turned in an arcuate path which lies in said plane and being capable of being subsequently separated from each other, said first and second segments each including at least one cooperating rail and groove which cause said segments to become interlocked together in manner which allows relative longitudinal movement therebetween, and said segments providing at least one longitudinally extending cavity for housing an optical fiber in such a manner that relative longitudinal movement between said segments and said optical fiber can occur.

16. The structure of claim 15, wherein the cooperating rail and groove which cause said segments to become locked together are provided by each segment including a longitudinally extending rail projecting from one surface thereof and a longitudinally extending groove opening to an opposite surface thereof, the rail of one segment adapted to be received in the groove of an adjacent segment when two segments are assembled together.

17. The structure of claim 16, wherein each segment includes two rails which project from said one surface thereof and wherein said longitudinally extending cavity is formed between two rails which project from said one surface of each segment and is adapted to receive an optical fiber therein, the cavity of one segment being covered by a portion of said opposite surface between two grooves of an adjacent segment when the two segments are assembled together.

18. The structure of claim 16, wherein said cavity in each said segment comprises a longitudinally extending passageway formed therein in which is adapted to be disposed an optical fiber, the transverse cross section of said passageway being larger than that of the optical fiber disposed therein.

* * * * *